Patented June 26, 1934

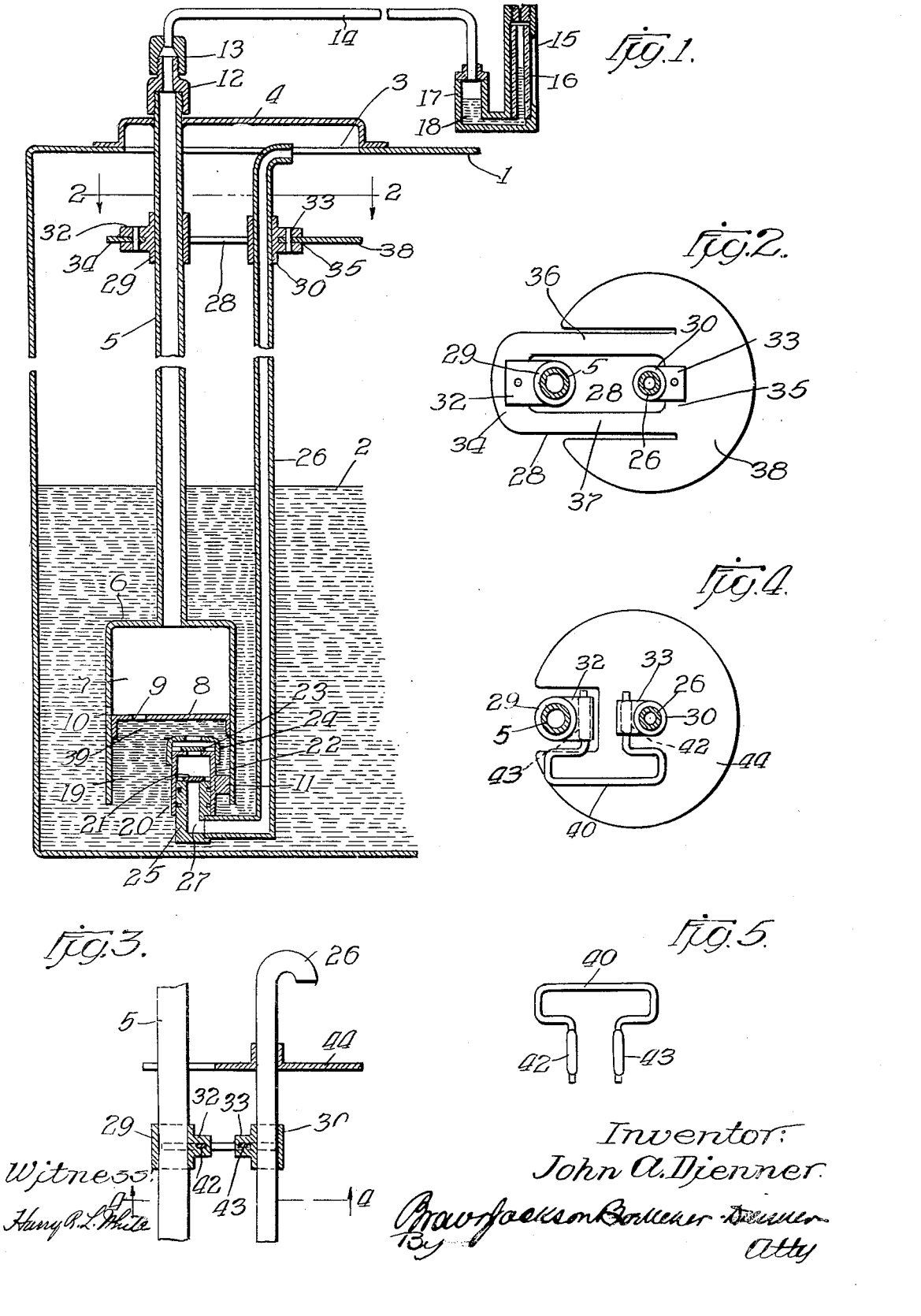

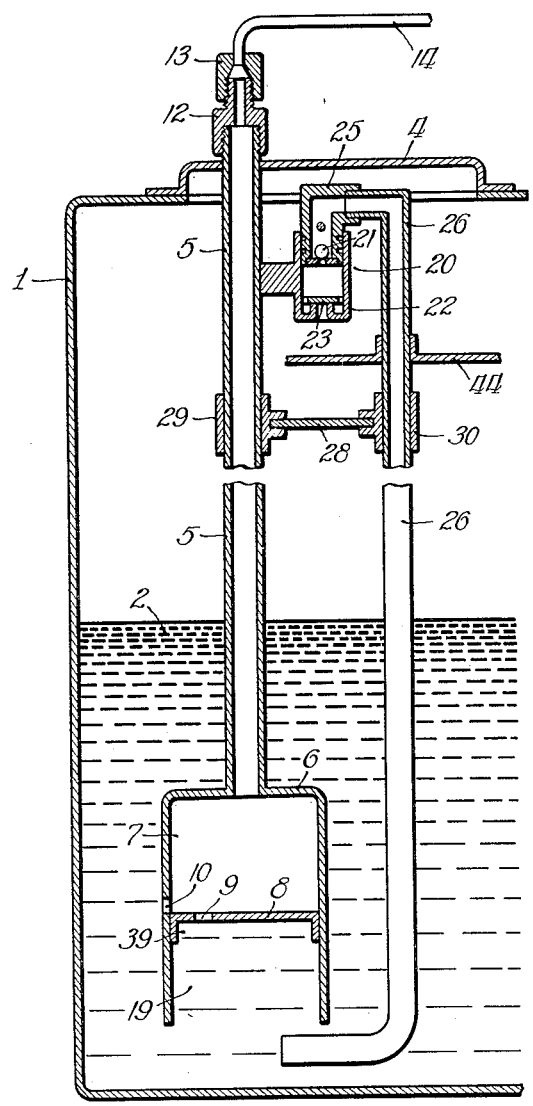

1,964,253

UNITED STATES PATENT OFFICE 1,964,253

PNEUMATIC GAUGE RECHARGING SYSTEM

John A. Dienner, Evanston, Ill., assignor to Bendix Stromberg Carburetor Company, Chicago, Ill., a corporation of Illinois Application July 29, 1932, Serial No. 626,065

7 Claims. (Cl. 73—54)

My invention relates to liquid level gauges for automobiles and the like. Pneumatic level indicating systems, operating on the principle of transmitting pneumatically to a remote indicator the hydrostatic head above a certain definite level in the tank, are known and have been widely used. Some means for recharging the pneumatic system with air or other gas is required, for it is common knowledge that changes in barometric pressure, temperature, as well as absorption of the gas, leakage of the gas, etc., cause loss of the pneumatic medium, which must be corrected by replenishing the pneumatic system with air or other gas.

I am aware of various schemes for automatically recharging a pressure indicating system with air, but the chief defect of the system now generally in use is its ineffectiveness, or impositive action. Furthermore, when the tank is kept substantially full of liquid it is difficult for such systems to force pneumatic medium to the bottom of the tank for recharging the system.

The chief object of the present invention is to provide a method of and means for positively pumping air into the system automatically.

The preferred embodiment of my invention involves the use of an air injecting device such as a pump or its equivalent operated by the motion of the containing tank or the liquid therein. Operation of the injecting device is preferably secured by a motor member of a type which will be operated by the motion of the tank itself. Such motor means may be inertia operated, wave operated, pressure operated, or operated in any other suitable manner, taking its power from the motion of the tank containing the liquid which is to be gauged. The injection device, or pump, and the motor, or automatic actuating device, may be combined structurally for the sake of economy and simplicity.

Preferably, but not necessarily, a vibratory suspension of the movable part or parts is provided within the tank. This is for the purpose of fostering the making of air injection strokes and also to provide a suspension or mounting which will not rattle or wear by continuous operation.

Now in order to acquaint those skilled in the art with the manner of constructing and operating a device embodying my invention I shall describe, in conjunction with the accompanying drawings, a specific embodiment of the same.

In the drawings:

Figure 1 is a diagram in vertical section of a system embodying my invention;

Figure 2 is a horizontal sectional view taken along the line 2—2 of Figure 1;

Figure 3 is a fragmentary illustration of a modified form of suspension and motor member;

Figure 4 is a horizontal section taken on the line 4—4 of Figure 3 and looking in the direction of the arrows;

Figure 5 is a plan view of the suspension spring shown in Figures 3 and 4; and

Figure 6 is a diagrammatic illustration of a modified form of air injection device wherein the air pump is in the upper part of the tank;

Referring first to Figures 1 and 2, the tank 1, which is adapted to contain the liquid 2 to be gauged, is an automobile tank for containing gasoline. This tank is carried on the frame of the vehicle and is subject to the movement of the vehicle frame. The liquid 2 is subject to agitation both due to the acceleration and deceleration of the vehicle in a horizontal direction, the tossing of the liquid up and down by vertical motion of the body, and to lateral movement as occurs when the vehicle turns a corner or deviates from a straight line.

The top of the tank has an opening 3 through which the trap and recharging mechanism is inserted. A cover plate 4, to which the parts are secured, is secured to the top of the tank over the opening 3. The cover 4 carries a downwardly extending air tube 5, at the lower end of which there is formed an enlargement 6 to define the air space or air trap 7. The enlargement or bell 6 extends downwardly to a point adjacent the bottom of the tank. A transverse plate 8 is disposed across the bell 6 and this plate 8 has an opening 9 by which air is admitted from the lower part of the bell into the air space 7. Likewise, one or more openings 10 are made through the sides of the bell 6 above the plate 8 to define the level from which depth is gauged.

At its upper end the pipe 5 is connected to the cover plate 4, as by soldering or the like, and a pipe fitting 12 provides a suitable connection for the coupling 13 by which the pipe or tube 5 is connected to the small bore transmission tube 14 leading to the indicating gauge 15.

The indicating gauge is preferably a liquid manometer comprising the indicating leg 16 and the pressure leg 17, connected by a suitable bore. The indicating leg 16 is formed by a glass tube, one side of which is made visible for inspection by a suitable slot in the casting which forms the body of the indicator 15. The liquid 18 in the indicator 16 is preferably heavier than the liquid 2, so that a relatively small range of motion of the liquid will balance the greater range of level of liquid 2 in the tank 1.

Instead of the manometer gauge 15 a diaphragm gauge or any other suitable gauge which will indicate by variations of pneumatic pressure the varying levels of liquid in the tank 1, may be employed.

The gauge per se is no part of the present invention and any suitable form of indicating device may be substituted for the manometer 15.

Within the lower portion 19 of the bell 6 and below the plate 8 I have disposed a pump 20 comprising the cylinder 22 having an upwardly facing discharge port controlled by the discharge check valve 23. The check valve 23 is preferably, but not necessarily, a light disc of considerable area so that it is readily unseated by pressure within the cylinder 22. The valve 23 is held in place in a cage 24, which may consist of a sheet metal stamping forced over the end of the cylinder 22.

A hollow plunger 25 carrying the discharge check valve 21 moves in the cylinder 22 to discharge the contents of the cylinder 22 into the chamber 19 below the plate or diaphragm 8.

The plunger 25 has a small bore tube 26 connected thereto, the bore of the tube communicating with the passageway 27 in the plunger 25. The tube 26 is rigidly connected to the plunger 25 and the two parts are mounted on a vibratory suspension, in this case a flat spring mounting 28. The form of the vibratory suspension may be modified. It performs two chief functions. The first is to hold the movable piston, consisting of the plunger 25 and the tube 26, in substantial alignment for vertical vibratory motion to make the strokes of the plunger 25 for discharging air from the tube 26 through the pump cylinder 22 into the base 19. The second function is to provide a support which will permit the vertical motion of the movable piston without rattling, or wear, and to give a slow enough period to the movable piston to insure strokes which will be effective to pump air or other fluid.

As shown in Figures 1 and 2, this suspension comprises a pair of sleeves 29 and 30, mounted upon the pressure tube 5 and the air inlet tube 26, respectively. The sleeves 29 and 30 have slotted ears 32 and 33 for receiving the portions 34 and 35 of the suspension 28 which is formed of thin flat spring stock. These portions 34 and 35 may be secured in the ears 32 and 33 as by pins, solder, or the like. The flat spring has two integral portions 36 and 37 extending between the parts 34 and 35, although, if desired, only one connection may be employed. An extended disc portion 38, integral with the parts 35, 36 and 37, provides a surface which is adapted to be operated upon by the liquid when the tank is shaken, thereby compelling motion of the tube 26 and plunger 25.

The disc 38 thus serves as a wave motor to move the tube 26 up and/or down, the resiliency of the spring always tending to bring the parts to an intermediate position.

The disc portion 38 may be omitted and the inertia of the parts depended upon for making the strokes, the vibratory suspension being so proportioned as to facilitate this action.

The upper end of the tube 26 may be turned horizontal or may be turned down or, if preferred, may face upwardly. It is desirable that the tube 26 be kept clear of liquid, but this is not essential for the device will operate to discharge whatever fluid enters the same. That is to say, if liquid should be drawn into the tube 26 it will not incapacitate the device, for the continued operation of the pump 20 will merely discharge the liquid and then proceed to draw air. Obviously, the tube 26 might be extended to the outside of the tank, if desired, but it is preferable, due to the violent motion to which the tank 1 is subjected, not to have any opening through the wall of the same. Also, it is desirable to keep the tube 26 wholly within the tank 1 for the purpose of excluding dust, or other foreign matter from the tube 26.

In Figures 3, 4 and 5 I have shown a modified form of suspension. In this case the sleeves 30 and 29 have the ears 32, 33 facing towards each other and they are pinched upon the flat portions 42 and 43 of the wire spring 40, which is so shaped as to provide a suitable degree of resiliency and freedom for vibratory motion. A separate wave motor disc 44 is secured to the upper end of the tube 26, this disc having clearance around the air tube 5, as indicated in Figures 3 and 4. The upper end of the tube 26 is shown as turned down, in this case. This may be done in any of the forms herein shown.

Instead of mounting the pump at the lower end of the tube 26 it may be mounted at the upper end of the tube 26, as shown in Figure 6. Also, it will be understood that while I have shown a plunger type of pump, a diaphragm pump might be equally well employed, as will be illustrated in detail later. Also, instead of moving the plunger it will be understood that the cylinder might be moved and the plunger held stationary.

In Figure 6 the lower end of the tube 26 extends under the chamber 19 and the upper end of the tube 26 is connected to the pump plunger 25, which has a ball check valve 21', serving in this case as the discharge check valve, and the stationary cylinder 22, which in this case is connected to the pipe 5, has the intake check 23.

The moving parts, namely, the plunger 25 and tube 26, are mounted upon the flat spring suspension 28 by means of the sleeves 29 and 30, as by means of the flat spring shown in Figs. 1 and 2, or the wire spring shown in Figs. 3, 4 and 5, or any other suitable construction.

A disc such as 44 may be mounted on the tube 26, this disc being preferably near the upper end of the tank so as to secure the benefit of wave motion of liquid within the tank. If the disc 44 is placed down where it is always submerged in the liquid it will tend to damp out the vibratory motion of the system. Even if so placed lower down along the tube 26 it will be effective, particularly when the liquid is driven to one end or the other of the tank by centrifugal action, as when the vehicle departs from a straight line while it is in motion.

I do not intend to be limited to the details shown and described, except as they are incorporated within the appended claims.

I consider the provision of a positive pump, taking air from the top of the chamber and discharging the same into the air valve, actuated by the motion of the tank or the contents thereof, to be broadly new.

I claim:

1. In combination, a pneumatic indicating system for indicating the depth of liquid in a movable tank, said system comprising an air trap adapted to be disposed in the liquid to be gauged, an indicator, a connecting conduit from trap to indicator, an air supply conduit connected to the air trap, and means operated by movement of said air supply conduit and independently of the liquid for supplying air to said trap.

2. In combination, a pneumatic indicating system for indicating the liquid contents of a movable tank, said system comprising an air trap adapted to be disposed with its open end below the surface of the liquid in the tank and an automatic air injecting device for injecting fluid into the air trap, said device having an intake connection disposed above the level of liquid in the tank and a discharge orifice below the open end of the air trap, said injecting device having a movable air supply conduit and connected piston adapted to be operated by movement of the tank and independently of movement of the liquid for making strokes, said device being caused by one stroke of the air supply conduit to take air in through said intake and being caused by another stroke of the member to discharge such intaken air through the discharge orifice.

3. In combination with a movable tank for liquid, a pneumatic indicating system having an air trap having an open end adapted to be submerged in the liquid to be gauged, an air injection device within the tank for injecting air from within the tank into the air trap below the level of liquid to be gauged, said device having a reciprocable air supply system and connected air displacing member and means actuated by movement of the tank and independently of movement of the liquid for reciprocating said member.

4. In combination with a pneumatic system, a tank for holding liquid and subject to movement as a whole, said pneumatic system having an air trap disposed in the tank and an automatic air pump disposed in the tank, said pump having an intake communicating with the air space in the top of the tank and a discharge communicating with the lower end of the air trap, and an air supply conduit movable relative to the tank by motion of the tank for supplying air to said trap independently of the movement of the liquid in the tank.

5. In combination with a movable tank for liquid, a pneumatic indicating system having an air trap having an open end adapted to be submerged in the liquid to be gauged, an air injecting device within the tank for injecting air from within the tank into the air trap below the level of liquid to be gauged, said device having an air replacement conduit movable relative to said tank, and a reciprocable air displacing member actuated by movement of said air replacement conduit.

6. In combinaton with a movable tank for liquid, a pneumatic indicating system having an air trap having an open end adapted to be submerged in the liquid to be gauged, an air injecting device within the tank for injecting air from within the tank into the air trap below the level of liquid to be gauged, said device having a reciprocable air replacement conduit and connected displacing member, said device being adapted to be actuated by changes in level of the liquid to be gauged.

7. In combination with a movable tank for liquid, a pneumatic indicating system having an air trap having an open end adapted to be submerged in the liquid to be gauged, an air injecting device within the tank for injecting air from within the tank into the air trap below the level of liquid to be gauged, said device having a reciprocable air replacement conduit and connected displacing member and a motor member actuated by wave motion of the liquid in the tank, said motor member and displacing member being connected together and having a vibratory suspension in the tank.

JOHN A. DIENNER.